United States Patent

Myers

[11] 3,719,100
[45] March 6, 1973

[54] ROLLER CHAIN

[76] Inventor: Dick T. Myers, Austin Drive R.F.D. No. 2, Willard, Ohio 44890

[22] Filed: March 8, 1971

[21] Appl. No.: 121,873

[52] U.S. Cl..................74/246, 74/250 R, 74/253 R
[51] Int. Cl..............................................F16g 13/02
[58] Field of Search......74/246, 253 R, 245 R, 250 R

[56] References Cited

UNITED STATES PATENTS

| | | | |
|---|---|---|---|
| 2,613,546 | 10/1952 | Jorgensen | 74/246 |
| 2,686,431 | 8/1954 | Simpkin | 74/246 |
| 2,789,685 | 4/1957 | Orwin | 74/246 X |
| 2,893,540 | 7/1959 | Freeman | 74/246 X |
| 2,941,657 | 6/1960 | Newcomb et al. | 74/246 X |
| 3,019,665 | 2/1962 | Rollins | 74/246 |
| 3,394,608 | 7/1968 | Johnson | 74/246 |

FOREIGN PATENTS OR APPLICATIONS

| | | | |
|---|---|---|---|
| 999,751 | 2/1952 | France | 74/246 |

*Primary Examiner*—Leonard H. Gerin
*Attorney*—Hamilton, Renner & Kenner

[57] ABSTRACT

A roller chain comprising a plurality of link members. The link members have spaced plates, and first rollers are mounted to extend between the plates. Second roller means are mounted on flanges extending from the plates, and the axes of the first and second rollers are nonparallel.

11 Claims, 4 Drawing Figures

INVENTOR.
DICK T. MYERS
BY Hamilton, Cook,
Renner + Kenner
ATTORNEYS

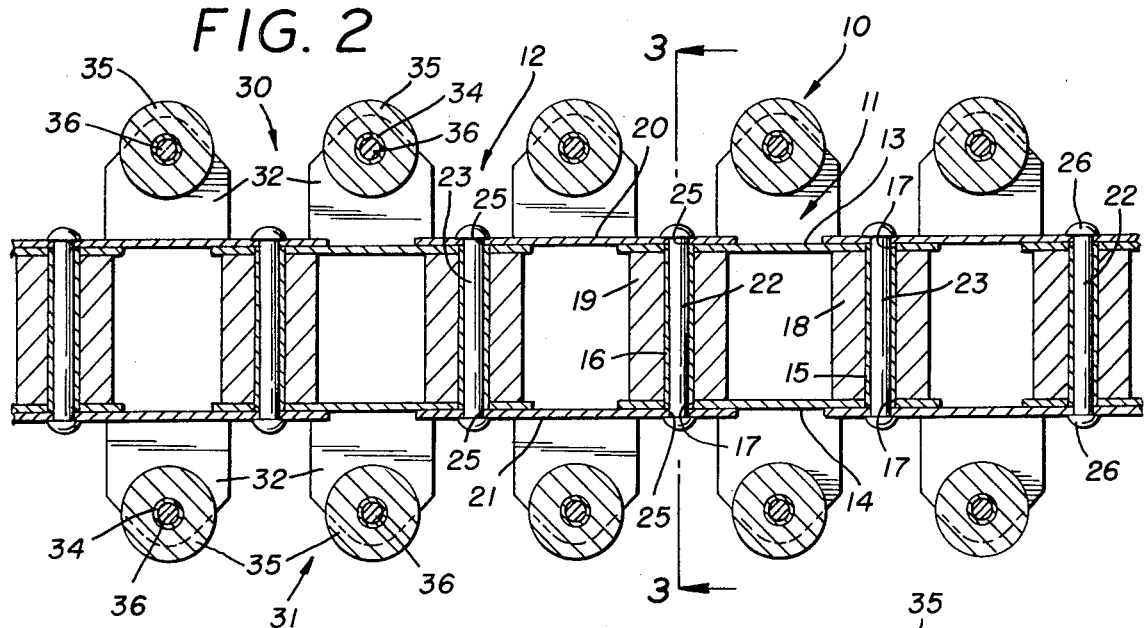
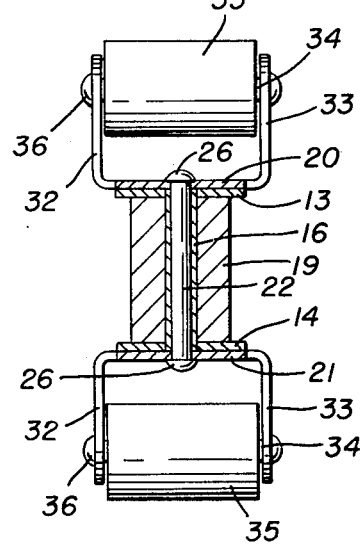
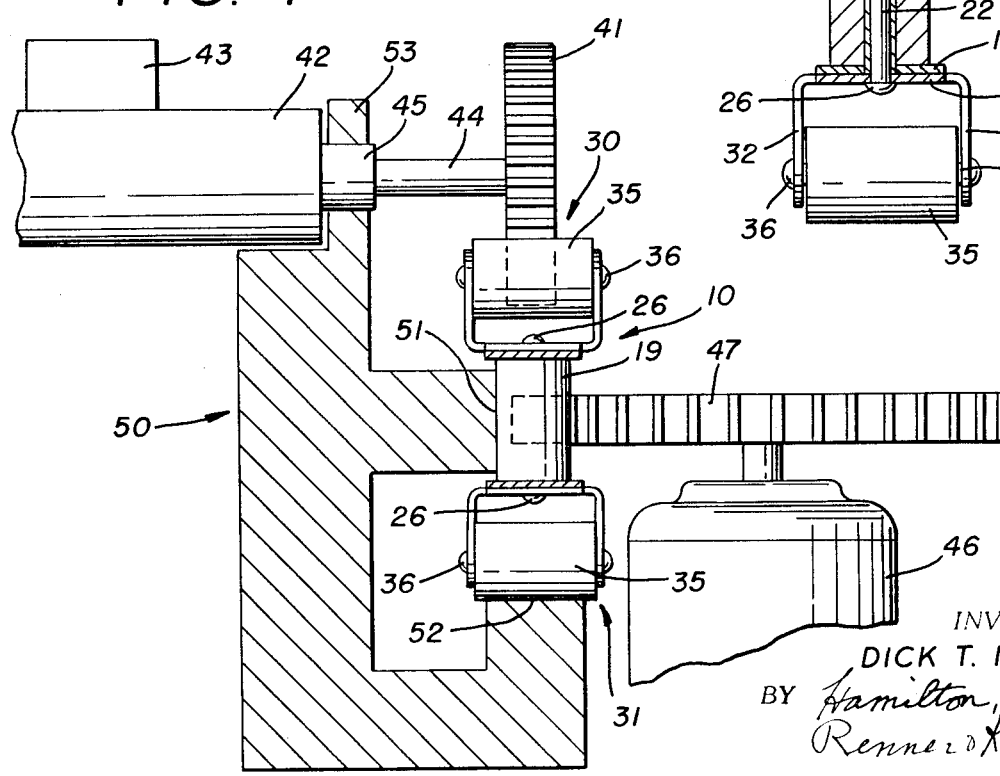

ROLLER CHAIN

BACKGROUND OF THE INVENTION

The present invention relates generally to chain drives which transmit power from one rotating shaft to one or more additional shafts. More particularly, the present invention relates generally to an improved roller chain portion of a chain drive. More specifically, the invention relates to a roller chain capable of operating in a chain drive having driving and driven sprockets whose axes are nonparallel.

Chain drives are commonly used for transmitting power from one rotating shaft to one or more additional shafts. Conventionally, such chain drives have sprockets mounted on the shafts and joined by a roller chain. Chain drives are also quite frequently employed to operate conveyors of the type consisting of a plurality of adjacent rolls rotatable by the shafts on which they are carried—the chain drive, or roller chain, engaging a driven sprocket on each shaft and a driving sprocket operatively connected to a motor or other power source. If the conveyor operates linearly between two points, the rolls may be positioned on parallel shafts and powered by a conventional chain drive. However, when it is necessary for the conveyor to follow a curved path it has normally been necessary to segmentize the curve with a plurality of linear conveyors or to supply power to individual rolls along the curved portions of the conveyor, thereby necessitating either a plurality of individual chain drives or a number of separate power sources. In either instance, the cost of the installation becomes virtually prohibitive.

Some efforts have been made to develop a single chain drive capable of powering rolls whose axes deviate slightly from a parallel orientation. One type of approach can be characterized as an attempt to achieve flexibility laterally of the direction in which the roller chain travels through the use of gross allowance between components of the roller chain. This approach is not only limited to minor deviations between the orientation of successive rolls but is also epitomized by a roller chain that creates excessive noise and is highly subject to wear. Another approach has contemplated a roller chain having alternating links movable in perpendicular planes; however, such designs have suffered the above disabilities and, additionally, require complex, nonconventional components which prove expensive.

SUMMARY OF THE INVENTION

It is an object of the invention to provide an improved roller chain for a chain drive capable of driving sprockets mounted on a plurality of nonparallel shafts.

Another object of the invention is to provide a roller chain which can matingly engage sprockets mounted on axes in at least two different planes.

A still further object of the present invention is to provide a roller chain having a first set of rollers which can matingly engage a plurality of sprockets driving and positioning the chain, and one or more additional sets of rollers which can matingly engage one or more driven sprockets.

An additional object is to provide a roller chain which can rollingly engage a sprocket or a plane surface on at least one side thereof.

Still another object of the invention is to provide a roller chain which employs substantially entirely standard chain drive components which is noncomplex, and which is inexpensive and easy to maintain.

In general, a roller chain embodying the concept of the present invention comprises a plurality of unique link means. A first roller means is associated with each link means, and at least selected link means are provided with plate means. A flange means extends outwardly of the plate means, and a second roller means is mounted on said flange means. The axes of said first and second roller means are other than parallel.

Other objects and a fuller understanding of the present invention may be had by referring to the following description of a preferred embodiment taken in conjunction with the accompanying drawings; however, no attempt is made to show various forms and modifications in which the invention might be embodied, the scope of this invention being measured solely by the scope of the appended claims.

DESCRIPTION OF THE DRAWINGS

FIG. 2 is a longitudinal section through the roller chain taken substantially along line 2—2 of FIG. 1;

FIG. 3 is a transverse section through the roller chain taken substantially along line 3—3 of FIG. 2; and, FIG. 4 is a schematic view, partially in section, depicting an exemplary arrangement by which a roller chain embodying the concept of the present invention effects a driving connection between sprockets mounted on nonparallel axes.

DESCRIPTION OF A PREFERRED EMBODIMENT

Figure 1:
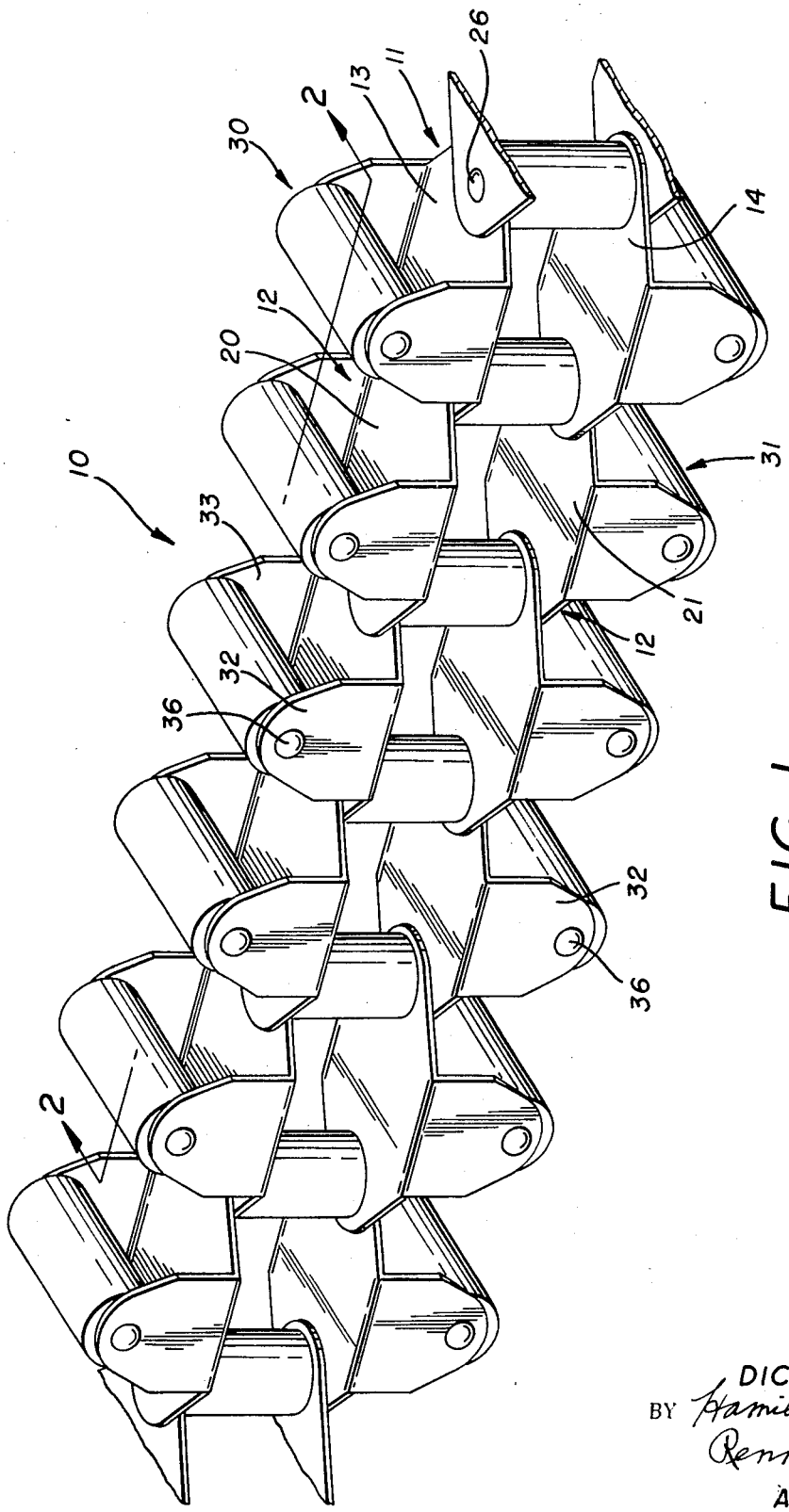
FIG. 1 is a perspective view of a portion of an assembled roller chain embodying the concept of the present invention.

Referring to the drawings and particularly to FIG. 1 thereof, an exemplary roller chain depicting the concept of the present invention is generally indicated by the numeral 10. The roller chain 10 has been simplified and adapted somewhat to more readily show various features of the present invention; however, as will be recognized by persons skilled in the art, the structure disclosed and described herein can be readily adapted to a wide variety of standard chain designs.

As shown, the roller chain 10 consists of a plurality of joined link members consisting of roller links and pin links, generally indicated by the numerals 11 and 12, respectively. The roller links 11 and pin links 12 are alternately positioned throughout the length of the roller chain 10 and are continuously joined in a manner described hereinafter. Each roller link 11 is an assembly having a pair of link plates 13 and 14 spaced and joined by a pair of bushings 15 and 16 (best seen in FIGS. 2 and 3) which are spaced a longitudinal dimension constituting the pitch of the roller chain. According to standard design practice, the link plates 13, 14 are preferably provided with bores 17 which are accurately sized for a press fit on the bushings 15, 16 so that the bushings do not turn in either link plate as the chain articulates. The bushings 15 and 16 rotatably mount hollow cylindrical rollers 18 and 19, respectively, of a proper length to rotate freely between the link plates 13, 14 without excessive freedom of movement.

Each pin link 12, alternately interposed between the roller links 11 is an assembly having a pair of link plates 20 and 21 which may be substantially identical to the link plates 13,14. The other components of each pin link 12 are a pair of pins 22 and 23 adapted to extend through and be press-fitted in bores 25 in the link plates 20 and 21 to prevent relative rotation. In order to prevent the link plates 20, 21 from being forced off the pins 22, 23, the extremities thereof may be softened and riveted, as depicted at 26, provided with cotter pins, or otherwise secured.

The mechanism thus far described is well known in the art and can be constructed to meet various requirements according to established chain drive design standards. However, it should be noted that, as with most conventional roller chains, all engaging drive and driven sprockets must be coplanar and have axes perpendicular to the plane of travel of the roller chain. The mechanism described hereinafter provides the additional operating capabilities and versatility set forth above in the recitation of objects of the present invention.

Referring to FIGS. 1–3, inclusive, the roller chain 10 may have one or two (as shown) additional roller tracks, generally indicated by the numerals 30 and 31, extending outwardly of both the roller links 11 and pin links 12. As shown, each of the link plates 13 and 14 of roller links 22 and link 11 20 and 21 of pin links 12 have spaced, opposed flanges 32 and 33 extending outwardly therefrom. Interposed between each opposed pair of flanges 32 and 33 is a bushing 34 which may be identical to bushings 15 and 16 and similarly mounted by press-fitting to prevent relative rotation. Each bushing 34 mounts a roller 35, which may be identical to rollers 18 and 19, that is freely rotatably mounted between the opposed flanges 32, 33 without excessive freedom of movement. A pin 36, comparable to the pins 23, may be extended through each opposed pair of flanges 32, 33 and the interposed bushing 34, and the extremities riveted to assist in maintaining the space relationship between the flanges 32 and 33.

An application of the versatile roller chain according to the concept of the present invention is shown in FIG. 4 wherein the roller chain is used to drive sprocket 41 of a conveyor roll 42 representing one of a plurality of rolls constituting a curved conveyor. In this particular application, the conveyor roll 42 together with other rolls (not shown) transport goods 43 in a curved path and hence the axes of the other rolls are nonparallel to each other and to roll 42. As shown, the roller chain 10 is driven by a power source such as motor 46 through a drive sprocket 47 which engages rollers 18 and 19 to remove the roller chain 10. The travel of the roller chain contemporaneously moves attached roller track 30 so that rollers 35 drive conveyor sprocket 41 which through a shaft 44 set in bushing 45 drives the roll 42.

In order to facilitate alignment between roller chain 10 and the sprockets 41 and 47, a guide member, generally indicated by the numeral 50, may be utilized. As shown, the guide member 50 has a rub rail 51 which serves to position the roller chain along a curved or other irregular path to insure engagement of rollers 18 and 19 with drive gear 47 and a tract 52 which serves to position the roller chain radially of the sprocket 41 of conveyor roll 42 for proper engagement. The guide member 50 may include an arm 53 which positions the bushing 45 of roll 42, or the roll 42 may, of course, be separately supported.

The application of the roller chain 10 depicted in FIG. 4 shows the capability for driving a plurality of sprockets mounted on nonparallel shafts. Further, the rollers 35 of roller tracks 30 and 31 are mounted on axes which are nonparallel to the axes of rollers 18 and 19 of the roller links 11. Specifically, the axes of rollers 35 of tracks 30 and 31 are shown in the preferred perpendicular orientation with respect to the axes of rollers 18 and 19; however, it should be appreciated that the axes of the rollers 35 of either or both tracks 30 and 31 may be oblique to the axes of rollers 18 and 19.

Numerous other variations as to the basic type of roller chain employed, the arrangement of driving and driven members, and the design of associated guide members may be made within the scope of the present invention herein disclosed and described as will be apparent to persons skilled in the art.

What is claimed is:

1. A continuous roller chain for a chain drive comprising, a plurality of interconnected link means having spaced plate means and first roller means mounted on said link means between said plate means, each said first roller means having an axis, flange means extending outwardly of said spaced plate means, second roller means mounted on said flange means and disposed outwardly of said plate means and said first roller means, each said second roller means having an axis, said axes of said first and second roller means being nonintersecting and other than parallel.

2. A roller chain, as set forth in claim 1, in which said plate means overlap each other and said link means are interconnected to each other by said first roller means mounted to said overlapping plates.

3. A roller chain, as set forth in claim 1, in which the axes of said first roller means lie in a plane substantially perpendicular to said spaced plate means.

4. A roller chain according to claim 3, wherein the axes of rotation of said second roller means are substantially perpendicular to the plane of the axes of said first roller means.

5. A roller chain, as set forth in claim 1, in which flange means extend outwardly of each said spaced plate means and individual second roller means are mounted on said flange means, said individual second roller means having axes, the axes of said individual second roller means being other than parallel with respect to the axes of said first roller means.

6. A roller chain, as set forth in claim 5, in which the axes of the individual second roller means mounted on each link means are parallel with respect to each other.

7. A roller chain, as set forth in claim 6, in which the axes of said individual second roller means mounted on each link means are substantially perpendicular to the axis of each said first roller means associated with said link means.

8. A roller chain, as set forth in claim 1, wherein each said flange means comprises a pair of spaced, opposed flanges.

9. A roller chain, as set forth in claim 8, wherein a bushing is nonrotatably mounted between said opposed pair of flanges.

10. A roller chain, as set forth in claim 9, wherein a pin extends through said opposed pair of flanges and said bushings.

11. A roller chain, as set forth in claim 10, wherein a roller is freely rotatably mounted on said bushings.

* * * * *